United States Patent
Kruglikov et al.

(10) Patent No.: US 10,191,671 B2
(45) Date of Patent: Jan. 29, 2019

(54) COMMON USERS, COMMON ROLES, AND COMMONLY GRANTED PRIVILEGES AND ROLES IN CONTAINER DATABASES

(71) Applicant: ORACLE INTERNATIONAL CORPORATION, Redwood Shores, CA (US)

(72) Inventors: Andre Kruglikov, Atherton, CA (US); Kumar Rajamani, San Ramon, CA (US); Jaebock Lee, Sunnyvale, CA (US); Sanket Jain, Sunnyvale, CA (US); Giridhar Ravipati, Foster City, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 14/835,507

(22) Filed: Aug. 25, 2015

(65) Prior Publication Data
US 2015/0363610 A1    Dec. 17, 2015

Related U.S. Application Data

(62) Division of application No. 13/841,272, filed on Mar. 15, 2013, now Pat. No. 9,122,644.
(Continued)

(51) Int. Cl.
*G06F 17/30* (2006.01)
*G06F 3/06* (2006.01)
(Continued)

(52) U.S. Cl.
CPC ............ *G06F 3/0619* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS

| 4,586,134 A | 4/1986 | Norstedt |
| 4,664,528 A | 2/1987 | Ahmed et al. |

(Continued)

OTHER PUBLICATIONS

Rajeev Kumar et al., Oracle DBA, A Helping Hand, Container Database and Pluggable Database (CDB & PDB), retrieved from the internet on Dec. 4, 2013, 2 pages.
(Continued)

*Primary Examiner* — Wilson Lee
(74) *Attorney, Agent, or Firm* — Hickman Palermo Becker Bingham LLP

(57) ABSTRACT

Techniques for common users and roles, and commonly-granted privileges and roles are described. In one approach, the DBMS of a container database allows for the creation of common roles and common users that are shared across the container database. Thus, when a common role or a common user is established, the common role or common user is propagated to each database of the container database. In another approach, the DBMS of a container database allows privileges and roles to be granted commonly or locally. When a privilege or role is granted commonly, the privilege applies in each of the databases of a container database. When a privilege or role is granted locally, the privilege applies only in the database to which the grantor of the privilege or role established a connection.

23 Claims, 6 Drawing Sheets

Related U.S. Application Data

(60) Provisional application No. 61/707,726, filed on Sep. 28, 2012.

(51) Int. Cl.
*G06F 11/14* (2006.01)
*G06F 21/62* (2013.01)
*G06F 12/084* (2016.01)
*G06F 13/16* (2006.01)

(52) U.S. Cl.
CPC ...... *G06F 11/1469* (2013.01); *G06F 11/1471* (2013.01); *G06F 12/084* (2013.01); *G06F 13/1663* (2013.01); *G06F 17/3048* (2013.01); *G06F 17/30289* (2013.01); *G06F 17/30292* (2013.01); *G06F 17/30557* (2013.01); *G06F 17/30566* (2013.01); *G06F 17/30595* (2013.01); *G06F 17/30867* (2013.01); *G06F 21/6218* (2013.01); *G06F 11/1448* (2013.01); *G06F 2201/80* (2013.01); *G06F 2201/835* (2013.01); *G06F 2212/60* (2013.01); *G06F 2212/62* (2013.01)

(56) References Cited

U.S. PATENT DOCUMENTS

| | | |
|---|---|---|
| 4,823,122 A | 4/1989 | Mann et al. |
| 5,047,922 A | 9/1991 | Borkar |
| 5,247,671 A | 9/1993 | Adkins et al. |
| 5,289,461 A | 2/1994 | De Nijs |
| 5,319,754 A | 6/1994 | Meinecke et al. |
| 5,392,285 A | 2/1995 | Kurts |
| 5,448,559 A | 9/1995 | Hayter et al. |
| 5,530,905 A | 6/1996 | Niuchols et al. |
| 5,553,239 A | 9/1996 | Heath et al. |
| 5,553,242 A | 9/1996 | Russell et al. |
| 5,596,745 A | 1/1997 | Lai et al. |
| 5,598,536 A | 1/1997 | Slaughter, III et al. |
| 5,600,722 A | 2/1997 | Yamaguchi et al. |
| 5,600,791 A | 2/1997 | Carlson et al. |
| 5,617,540 A | 4/1997 | Civanlar et al. |
| 5,633,861 A | 5/1997 | Hanson et al. |
| 5,642,515 A | 6/1997 | Jones et al. |
| 5,682,534 A | 10/1997 | Kapoor et al. |
| 5,684,800 A | 11/1997 | Dobbins et al. |
| 5,734,659 A | 3/1998 | Mann et al. |
| 5,740,175 A | 4/1998 | Wakeman et al. |
| 5,761,507 A | 6/1998 | Govett |
| 5,771,349 A | 6/1998 | Picazo, Jr. et al. |
| 5,774,660 A | 6/1998 | Brendel et al. |
| 5,774,668 A | 6/1998 | Choquier et al. |
| 5,790,800 A | 8/1998 | Gauvin et al. |
| 5,805,816 A | 9/1998 | Picazo et al. |
| 5,805,827 A | 9/1998 | Chau et al. |
| 5,805,920 A | 9/1998 | Sprenkle et al. |
| 5,828,879 A | 10/1998 | Bennett |
| 5,873,102 A * | 2/1999 | Bridge, Jr. ........ G06F 17/30557 707/640 |
| 5,890,167 A * | 3/1999 | Bridge, Jr. ........ G06F 17/30339 |
| 5,944,823 A | 8/1999 | Jade et al. |
| 5,963,556 A | 10/1999 | Varghese et al. |
| 5,974,463 A | 10/1999 | Warrier et al. |
| 5,978,849 A | 11/1999 | Khanna |
| 5,987,430 A | 11/1999 | Van Horne et al. |
| 6,006,264 A | 12/1999 | Colby et al. |
| 6,088,728 A | 7/2000 | Bellemore et al. |
| 6,138,120 A | 10/2000 | Gongwer et al. |
| 6,310,883 B1 | 10/2001 | Mann et al. |
| 6,321,235 B1 | 11/2001 | Bird |
| 6,804,671 B1 | 10/2004 | Loaiza et al. |
| 6,950,848 B1 | 9/2005 | Yousefi'zadeh |
| 7,035,931 B1 * | 4/2006 | Zayas ............... G06F 17/30067 707/999.003 |
| 7,039,654 B1 | 5/2006 | Eder |
| 7,136,825 B2 | 11/2006 | Araki et al. |
| 7,174,379 B2 | 2/2007 | Agarwal et al. |
| 7,346,690 B1 | 3/2008 | Sinha et al. |
| 7,506,034 B2 | 3/2009 | Coates et al. |
| 7,512,686 B2 | 3/2009 | Berg |
| 7,822,717 B2 | 10/2010 | Kappor et al. |
| 8,364,648 B1 | 1/2013 | Sim-Tang |
| 8,549,038 B2 | 10/2013 | Narasinghanallur et al. |
| 8,943,181 B2 | 1/2015 | Kasten et al. |
| 9,122,644 B2 * | 9/2015 | Kruglikov ........... G06F 11/1471 |
| 9,684,561 B1 * | 6/2017 | Yan ..................... G06F 11/1412 |
| 2001/0027406 A1 | 10/2001 | Araki et al. |
| 2002/0112022 A1 | 8/2002 | Kazar et al. |
| 2002/0143733 A1 * | 10/2002 | Mukkamalla ..... G06F 17/30592 |
| 2002/0147652 A1 | 10/2002 | Gheith et al. |
| 2003/0023572 A1 * | 1/2003 | Jowell ............... G06F 17/30401 706/45 |
| 2003/0061537 A1 | 3/2003 | Cha et al. |
| 2003/0065986 A1 | 4/2003 | Fraenkel et al. |
| 2003/0081748 A1 | 5/2003 | Lipinski |
| 2003/0172145 A1 | 9/2003 | Nguyen |
| 2003/0208523 A1 | 11/2003 | Gopalan et al. |
| 2003/0229695 A1 | 12/2003 | McBride |
| 2004/0030801 A1 | 2/2004 | Moran et al. |
| 2004/0117375 A1 | 6/2004 | Saha et al. |
| 2004/0176996 A1 | 9/2004 | Powers et al. |
| 2004/0205101 A1 | 10/2004 | Radhakrishnan |
| 2004/0221031 A1 | 11/2004 | Desai |
| 2004/0257985 A1 | 12/2004 | Sahai et al. |
| 2004/0267809 A1 | 12/2004 | East et al. |
| 2005/0038831 A1 | 2/2005 | Souder et al. |
| 2005/0038833 A1 | 2/2005 | Colrain et al. |
| 2005/0262183 A1 | 11/2005 | Colrain et al. |
| 2006/0143217 A1 | 6/2006 | Stanev |
| 2007/0100912 A1 | 5/2007 | Pareek et al. |
| 2007/0244918 A1 | 10/2007 | Lee et al. |
| 2008/0027769 A1 | 1/2008 | Eder |
| 2008/0155688 A1 | 6/2008 | Casazza |
| 2009/0183225 A1 * | 7/2009 | Malakapalli ........ G06F 21/335 726/1 |
| 2009/0215469 A1 * | 8/2009 | Fisher .................. H04L 12/588 455/456.3 |
| 2010/0185733 A1 * | 7/2010 | Hon .................. G06F 17/30029 709/205 |
| 2010/0205153 A1 * | 8/2010 | Lamm ............... G06F 17/30575 707/655 |
| 2010/0250712 A1 | 9/2010 | Ellison |
| 2010/0318570 A1 * | 12/2010 | Narasinghanallur ...................... G06F 17/30289 707/783 |
| 2011/0004586 A1 | 1/2011 | Cherryholmes et al. |
| 2011/0060724 A1 | 3/2011 | Chan |
| 2011/0087633 A1 | 4/2011 | Kreuder et al. |
| 2011/0112901 A1 * | 5/2011 | Fried .................. G06Q 30/0251 705/14.49 |
| 2011/0126118 A1 * | 5/2011 | Bergeron ............. G06F 9/4443 715/744 |
| 2011/0307450 A1 | 12/2011 | Hahn et al. |
| 2011/0314035 A1 | 12/2011 | Brunet et al. |
| 2012/0075648 A1 | 3/2012 | Keys et al. |
| 2012/0079080 A1 * | 3/2012 | Pishevar ................ A63F 13/12 709/220 |
| 2012/0109926 A1 | 5/2012 | Novik et al. |
| 2012/0226659 A1 * | 9/2012 | Ball ..................... 707/609 |
| 2012/0227086 A1 * | 9/2012 | Dale ..................... G06Q 50/01 726/3 |
| 2013/0085742 A1 | 4/2013 | Barker et al. |
| 2013/0117237 A1 | 5/2013 | Thomsen et al. |
| 2013/0198824 A1 | 8/2013 | Hitchcock et al. |
| 2013/0212068 A1 | 8/2013 | Talius et al. |
| 2013/0226816 A1 * | 8/2013 | Chory ............... G06Q 10/06313 705/301 |
| 2014/0006344 A1 | 1/2014 | Narasinghanallur |
| 2014/0090084 A1 * | 3/2014 | Goodinson ........ G06Q 10/101 726/28 |
| 2014/0095452 A1 | 4/2014 | Lee et al. |
| 2014/0095530 A1 | 4/2014 | Lee et al. |

(56) References Cited

U.S. PATENT DOCUMENTS

| | | |
|---|---|---|
| 2014/0095546 A1 | 4/2014 | Kruglikov et al. |
| 2014/0164331 A1 | 6/2014 | Li et al. |
| 2014/0222824 A1 | 8/2014 | Joshi et al. |

OTHER PUBLICATIONS

Preimesberger, Chris, "Oracle Profits Up, but Revenues Slip" Oracle, dated Sep. 20, 2012, 2 pages.

Oracle Base, Multitenant: Create and Configure a Pluggable Database (PDB) in Oracle Database 12c Release 1 (12.1), dated Jan. 8, 2014, 16 pages.

Muhammad Anwar, "How to Install Oracle 12c Multitenant Pluggable Database", Dated Feb. 24, 2012, 27 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for the Cloud," 3rd Edition, Microsoft, 2012, 246 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

Pachot, Frank, "Oracle 12cR2: MAX_PDBS", dated Nov. 11, 2016, https://blog.dbi-services.com/oracle-12cr2-max_pdbs/, 12 pages.

Sellis, Tim, "Multiple-query Optimization" dated Mar. 1988.

U.S. Appl. No. 12/484,977, filed Jun. 15, 2009, Notice of Allowance, dated May 28, 2013.

U.S. Appl. No. 14/014,302, filed Aug. 29, 2013, Office Action, dated Apr. 14, 2016.

U.S. Appl. No. 14/014,302, filed Aug. 29, 2013, Notice of Allowance, dated Jul. 12, 2016.

U.S. Appl. No. 14/014,302, filed Aug. 29, 2013, Interview Summary, dated Jun. 9, 2016.

U.S. Appl. No. 12/484,977, filed Jun. 15, 2009, Office Action, dated Jun. 28, 2011.

U.S. Appl. No. 12/484,977, filed Jun. 15, 2009, Final Office Action, dated Nov. 22, 2011.

\* cited by examiner

COMMON USERS, COMMON ROLES, AND COMMONLY GRANTED PRIVILEGES AND ROLES IN CONTAINER DATABASES

CROSS-REFERENCE TO RELATED APPLICATIONS; BENEFIT CLAIM

This application claims priority as a divisional to U.S. Non-Provisional application Ser. No. 13/841,272, filed on Mar. 15, 2013, the contents of which are incorporated herein by reference, which claims priority to U.S. Provisional Application No. 61/707,726, entitled CONTAINER DATABASE, filed on Sep. 28, 2012 by J. William Lee, et. al., the contents of which are incorporated herein by reference. The application is related to U.S. Non-provisional application Ser. No. 13/631,815, entitled CONTAINER DATABASE, filed on Sep. 28, 2012 by J. William Lee, et. Al, the contents of which are hereby incorporated herein by reference. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to common users, common roles, and commonly granted privileges and roles in container databases.

BACKGROUND

Database Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Database Consolidation

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database consolidation involves distributing and sharing computer resources of a hardware platform among multiple databases. Important objectives of database consolidation include isolation, transportability, and fast provisioning. Isolation is the ability to limit an application's access to the appropriate database; an application is permitted access to a database while other applications are prevented access.

Users, Privileges, and Roles

For security purposes, DBMSs often maintain a list of valid database users. To access a database, a user typically connects to a database server instance and provides a username and password. The database server then checks the user name and password against the list of valid users defined in the database to determine whether to grant the user access.

In some cases, DBMSs allow the resources available to each user of the database to be customized. The right to access a particular resource of the database will be referred to as a privilege. For example, a privilege may represent the right to execute a particular type of database command or the right to access a particular database object.

For convenience, some DBMSs allow multiple privileges to be bundled into a package referred to as a role. Thus, when a user is granted a role, the user obtains all the privileges associated with the role. For example, the database may define a role associated with high ranking users that includes nearly all available privileges, such as the ability to assign privileges to other users, create and modify database objects, etc. In addition, the database may define a role associated with low-ranking users, which may possess some privileges, such as the ability to connect with the database and perform queries, but lack other privileges such as the right to modify database objects.

Often, DBMSs are installed by default with an administrator that possesses global access to the databases resources. The administrator then creates the other users and assigns roles and privileges.

DETAILED DESCRIPTION

Figure 1:
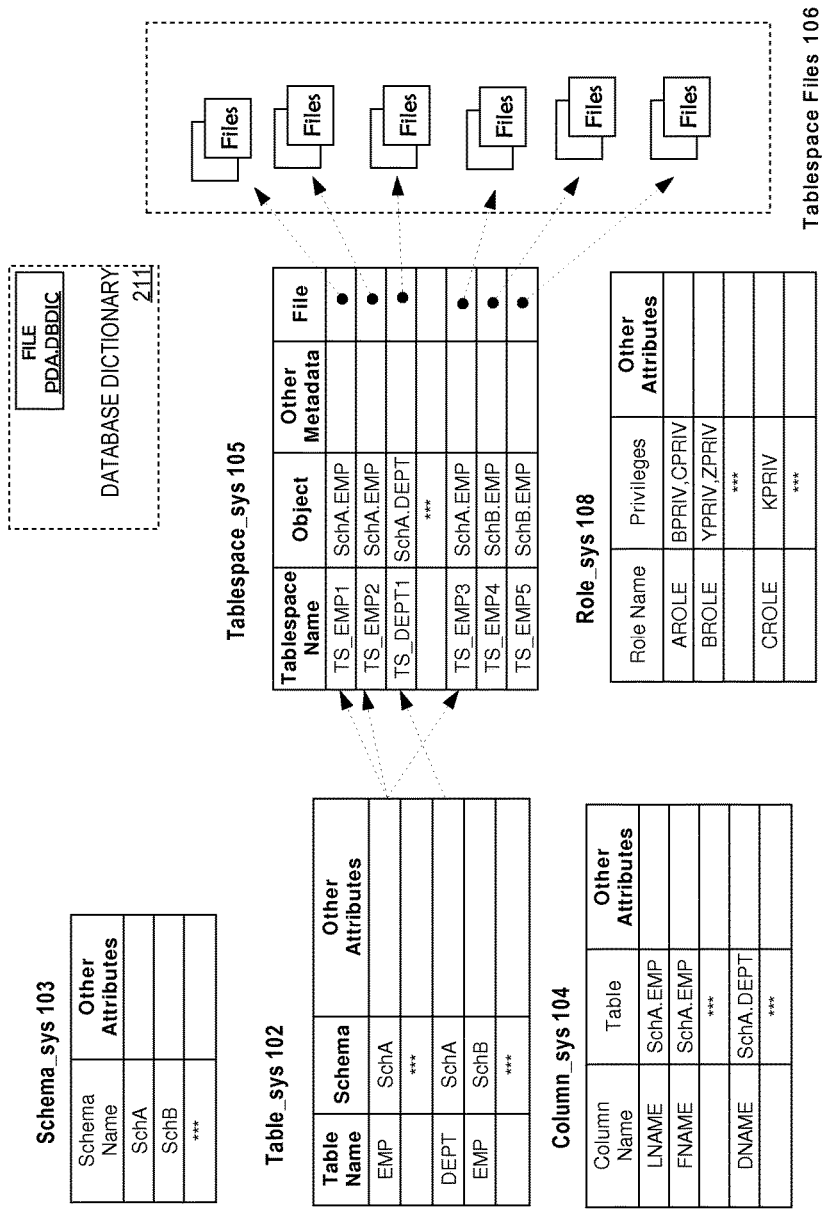
FIG. 1 is a diagram depicting a database dictionary according to an embodiment.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are approaches to managing users, privileges, and roles on a container database. The container database may contain multiple separate databases. Each database is defined by its own separate database dictionary.

A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object. In addition, the database dictionary defines the users and roles of a database, in addition to the privileges granted to each of the users and roles.

A database dictionary is referred to by a DBMS to determine how to execute database commands submitted to a DBMS. Database commands can access the database objects that are defined by the dictionary.

A container database may contain multiple database dictionaries for each database, each such database dictionary defining the database. When database sessions are established on a container database, each database session is given access to a database by establishing the respective database dictionary of the database as the database dictionary for that database session. Database commands issued through the database session can only access the database objects defined in the database dictionary established for the database session.

Managing users, roles, and the privileges granted to users and roles across all the databases in a container database can be a daunting task. For example, a user may require the ability to establish a session on any database in the container database. Thus, an administrator setting up the user's account may wind up establishing a session to each database and setting up the user's account individually. Furthermore, should the user's information need to be changed (e.g. a routine changing of the user's password), the administrator may find themselves logging into each database to perform the necessary modifications. In scenarios where the container database contains a large number of databases, this task may be extremely time-consuming. The same issue also applies to roles, when the administrator wants to keep roles consistent throughout the container database.

In an embodiment, the DBMS allows for the creation of common roles and common users that are shared across the container database. Thus, when a common role or a common user is established, the common role or common user is propagated to each database of the container database. For example, the DBMS may establish a root database as the origin point for common users and roles. Thus, to create a common user or role, an administrator or other privileged user creates a session to the root database and creates the common user or role. The changes to the database dictionary of the root database performed as a result of creating the common user or role are then propagated to the other databases in the container database. Furthermore, in the event that a common user or role is modified or removed at the root database, those changes are also propagated to the other databases. As a result, an administrator can maintain users and roles across the container database without setting up the users and roles separately on each database.

Furthermore, in some embodiments, the DBMS of a container database allows privileges and roles to be granted commonly or locally. When a privilege is granted commonly, the privilege applies in each of the databases of a container database. When a privilege is granted locally, the privilege applies only in the database to which the grantor of the privilege established a connection. Similarly, when a role is granted commonly, the role is granted in each of the databases of the container database. When a role is granted locally, the role is granted only in the database to which the grantor of the role established a connection.

Database Dictionary and Database Data Storage

As indicated earlier, the database dictionary is central to a DBMS's management of a database. The database dictionary contains metadata that defines database objects physically or logically contained in the database. Database objects include tables, columns, data types, users, privileges, roles, and storage structures used for storing database object data. The database dictionary is modified according to DDL commands issued to add, modify, or delete database objects.

FIG. 1 depicts a Database Dictionary 101. For purposes of exposition, only some aspects of Database Dictionary 101 and data structures contained therein are depicted in FIG. 1. Database dictionary 101 includes Table_sys 102, Schema_sys 103, Column_sys 104, Tablespace_sys 105, User_sys 107, and Role_sys 108.

Table_sys 102 is a table that contains metadata that defines, at least in part, tables within a database. Table_sys 102 comprises (1) records that each define a table, and (2) attributes, each of which describe an aspect or property of a table. Among such attributes are Table Name and Schema. Table_sys 102 contains other attributes not specifically depicted in FIG. 1. Table Name is a name or label for a table, and Schema is the schema to which the table belongs. A schema is a defined and/or labeled set of database objects. One record in Table_sys 102 defines a table as having the name EMP and belonging to schema SchA. Another record defines a table as having the name DEPT and belonging to schema SchA. A third record in Table_sys 102 defines another table also as having the name EMP, but belonging to schema SchB.

Schema_sys 103 defines schemas. Schema_sys 103 has attribute Schema Name as well as other attributes. One record in Schema_sys 103 defines a schema having the name SchA; another record defines a schema having the name SchB.

Column_sys 104 is a table containing metadata defining column database objects. Column_sys 104 has attributes Column Name and Table, among other attributes. Column Name is a name or label for a column, and Table identifies a table to which a column belongs.

Tablespace_sys 105 is a table defining tablespaces. A tablespace is set of one or more files, or one or more portions of a file, or combination thereof, that is used to store data for database objects, such as data for a table or index. Each record in Tablespace_sys 105 defines a tablespace. Attributes of Tablespace_sys 105 each describes an aspect or property of a tablespace. The attribute Tablespace Name is a name or label for a tablespace. Attribute Object identifies a database object for which a tablespace stores data. Attribute File specifies one or more files that are in a tablespace. One record in Tablespace_sys 105 defines a tablespace as having the name TS_EMP1 and being used to store table EMP in schema SchA, as specified by the Object attribute value of SchA.EMP. Another record in Tablespace_sys 105 defines a tablespace as having the name TS_DEPT1 and being used to store data for table DEPT in schema SchA, as specified by the Object attribute value of SchA.EMP. Yet another record in Tablespace_sys 105 defines a tablespace as having the name TS_EMP4 and being used to store table EMP in schema SchB, as specified by the Object attribute value of SchB.EMP.

User_sys 107 is a table containing metadata defining users of the database. Each record in User_sys 107 defines a user's name, privileges, roles, and password, among other attributes. In one record, user SchA is shown as being assigned privilege APRIV, role AROLE, and password PASSWORD1.

For convenience, the embodiment illustrated by FIG. 1 assumes each user owns only one schema, which is named after the user. However, in other embodiments, users may own multiple schema and User_sys 107 may contain an additional attribute that specifies the schemas owned by each user. When a user "owns" a schema, the user will be assumed to possess certain privileges associated with the schema by default, such as the right to modify the schema and the database objects defined by the schema. The privileges of owning a schema may also include the right to grant those privileges to other users. However, in other embodiments, an administrator may explicitly grant the aforementioned privileges to the users, rather than the privileges inuring automatically as a result of owning the schema.

In some embodiments, certain information in User_sys 107 may be encrypted for security reasons, such as the Password attribute. In some embodiments, the Password attribute may instead store an encryption key, biometrics, or any other information that can be used to verify the identity of the user.

Role_sys 108 is a table containing metadata defining various roles of the database. In one record, Role AROLE is depicted as possessing both the privileges BPRIV and CPRIV. Thus, user SchA which has been assigned the role AROLE effectively possesses privileges BPRIV and CPRIV in addition to the privilege APRIV.

Database Dictionary 101 is expositive and illustrative of a database dictionary but not limiting. For example, a database dictionary may have more tables and attributes than those depicted for Database Dictionary 101. In addition, although Database Dictionary 101 depicts the users and roles being assigned a particular number of privileges, other embodiments may assign any number of privileges to users and roles. Furthermore, data structures of a database dictionary are not limited to tables, such as the tables depicted in FIG. 1

Storage of Database Dictionary Metadata

Metadata for a database dictionary is stored persistently in a dictionary store. A dictionary store may be, without limitation, one or more files, including a tablespace's file. When a database server is running, the database dictionary comprises, at least in part, one or more data structures in volatile memory ("in-memory data structures") that store at least a portion of metadata that is in the dictionary store. Such in-memory data structures are created and populated with metadata from a dictionary store when, for example, initializing a database server or instance for operation. Examples of in-memory data structures include tables depicted earlier, such Column_sys 104 and Table_sys 102.

Once the in-memory data structures are populated, the metadata in the in-memory data structures may be quickly accessed by database operations that require the use of a database dictionary, such as query evaluation. Populating the in-memory data structures is referred to herein as loading the database dictionary.

Namespace

A namespace is a domain in which names or labels of objects of a particular type must be unique for objects of that type. Database Dictionary 101 includes several different namespaces.

One such namespace is the namespace for a table. The namespace for a table is bounded by a schema. A name of a table is unique between names of other tables belonging to the schema. The namespace for a column is bounded by a table. A column name is unique among other columns names for a table.

For a schema and a tablespace, the namespace is bounded by a database, as defined by Database Dictionary 101. A name of a schema is unique between names of other schemas defined by Database Dictionary 101. A name of a tablespace is unique between names of other tablespaces defined by Database Dictionary 101. Note that even though tablespaces TS_EMP1, TS_EMP2, TS_EMP3, TS_EMP4, TS_EMP5 store data for tables named EMP, the tablespaces's namespace require that the tablespaces have unique names.

Container Database

Figure 2:
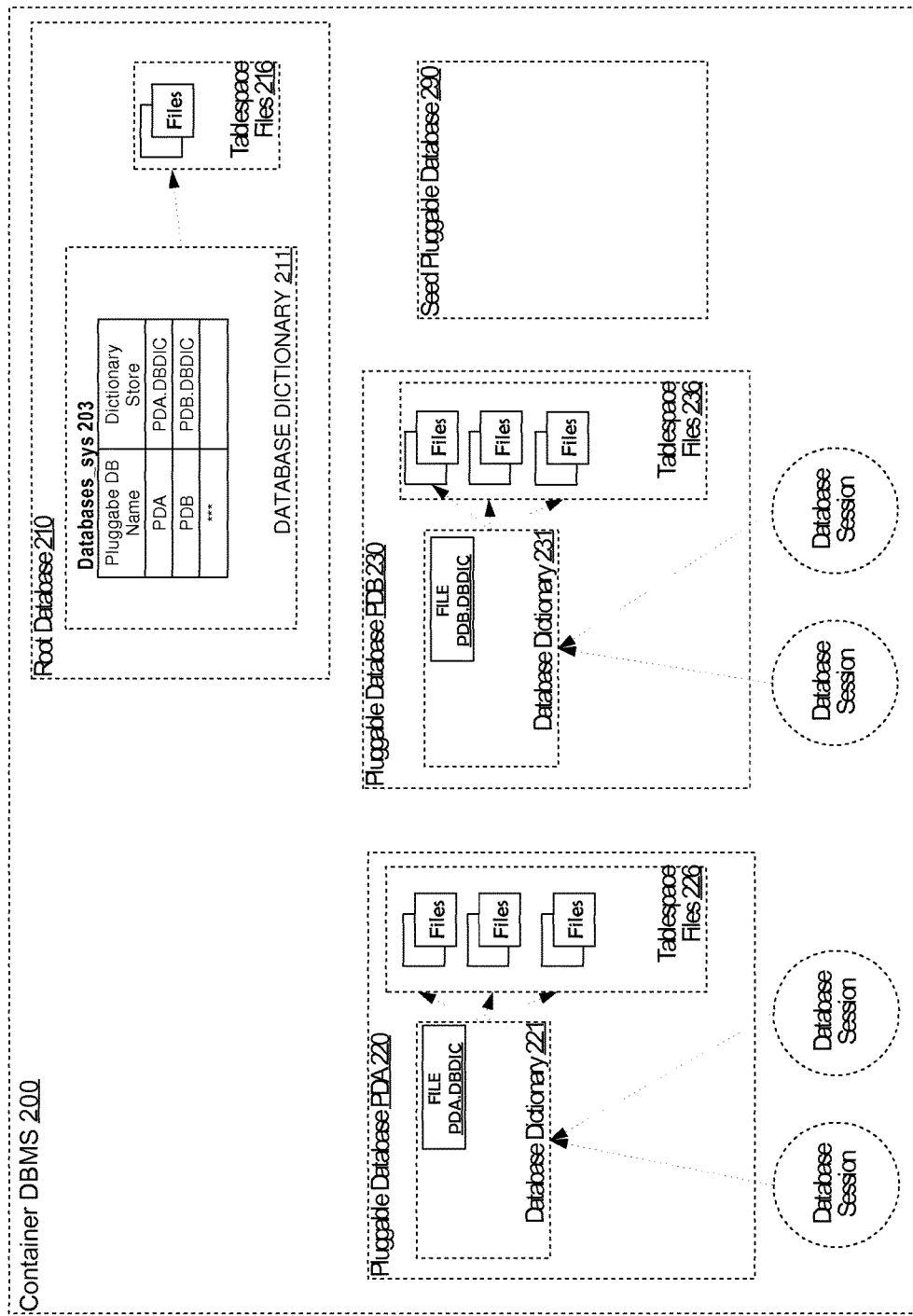
FIG. 2 is a diagram depicting a container database according to an embodiment.

FIG. 2 depicts a Container DBMS 200, a container DBMS according to an embodiment of the present invention. Container DBMS 200 contains multiple databases that are hosted and managed by a database server. The databases include Pluggable Database PDA 220 and Pluggable Database PDB 230, and Root Database 210, which is associated with Pluggable Database PDA 220 and Pluggable Database PDB 230, as shall be explained in greater detail. Pluggable databases and the associated root database, such as Pluggable Database PDA 220, Pluggable Database PDB 230 and Root Database 210, are collectively referred to herein as a container database. A container DBMS may contain more pluggable databases than the number of pluggable databases that are depicted in FIG. 2. Root Database 210 is a database used to globally manage the container database and to store metadata and/or data for "common database objects" that are accessible to users of multiple pluggable databases.

Referring to FIG. 2, Pluggable Database PDA 220 includes Database Dictionary 221. Data for database objects of Pluggable Database PDA 220 is stored in Tablespace Files 226. Similar to user data, metadata for a database dictionary is stored persistently in a dictionary store. Metadata contained in Database Dictionary 221 is stored in file PDA.DBDIC.

Pluggable Database PDB 230 includes Database Dictionary 231. Tablespace Files 236 store data for database objects of Pluggable Database PDB 230. Metadata for a Database Dictionary 231 is stored persistently in file PDB.DBDIC.

A database dictionary of the pluggable database may be referred to herein as a pluggable database dictionary. A database object defined by a pluggable database dictionary that is not a common database object is referred to herein as a local object.

Database Session

A user may access a database within Container DBMS 200 by establishing the respective database dictionary of the database as a database dictionary for the database session. Once the database dictionary is established as the database dictionary of the session, access is isolated to the database objects of the database, and to common database objects of the root database, as shall be described in further detail. A database dictionary is established for a database session by a database server in response to a connection request from the user for the database. Establishing the database dictionary as a database dictionary for a database session may be referred to herein as attaching the database dictionary. A session may be created to any the pluggable databases or the Root Database 210.

With respect to the database objects in one or more databases of a container database, execution of database commands issued to a database session attached to a database dictionary can only access database objects that are defined by the database dictionary. Consequently, users of the database session can only access database objects that are defined by the attached database dictionary, thereby isolating database access to database objects to those in the respective database. This isolation not only applies to end users but may also to administrators of the container database.

For example, in response to a connection request for access to Pluggable Database PDA 220, Database Dictionary 221 is attached to the database session. Database commands issued in the database session are executed against Database Dictionary 221. Access to pluggable database objects through DML commands issued in the database session is isolated to pluggable database objects defined by Database Dictionary 221. Isolation by concurrently executing database sessions with Pluggable Database PDA or Pluggable Database PDB is achieved in the same manner.

Root Database

Root Database 210 is a database used to globally manage Container DBMS 200. An important function facilitated by Root Database 210 is to define pluggable databases within Container DBMS 200. Similar to pluggable databases, Root Database 210 includes Database Dictionary 211. The database dictionary of a root database may be referred to herein as a root database dictionary. Database Dictionary 211 contains metadata that defines various aspects of Container DBMS 200 needed to administer Container DBMS 200 and the databases contained therein. Data for database objects defined by Database Dictionary 211 is stored in Tablespace Files 216.

Database Dictionary 211 includes Database_sys 203. Database_sys 203 defines pluggable databases within Container DBMS 200. Attributes of Database_sys 203 each describes an aspect or property of a pluggable database. The attribute Pluggable DB is a name or label for a pluggable database. The attribute Dictionary Store identifies a dictionary store that holds metadata in a database dictionary. One record in Database Dictionary 211 defines Pluggable Database PDA 220 and its dictionary store file PDA.DBIDC. Another record in Database Dictionary 211 defines Pluggable Database PDB 220 and its dictionary store PDB.DBIDC.

In an embodiment, the Database Dictionary 211 defines common database objects that are in effect shared by pluggable databases in Container DBMS 200. A common database object is defined in a pluggable database dictionary, which includes a reference to the common database object in the respective root database dictionary. Examples of common database objects include vendor or user supplied functions, tables, and views.

According to an embodiment, there are two types of common database objects: a metadata-linked object and an object-linked object. For both, metadata for the common database object is stored in the Root Database. However, for a metadata-linked object, data for the common database object, if any, is stored in a pluggable database. Thus, for a metadata-linked object, different pluggable databases may store different data for the same common database object. For an object-linked object, both the metadata and data for the database object, if any, are stored in the root database. Data for this type of common database object is the same for all pluggable databases in a container database.

Seed Pluggable Database 290 contains database objects and a database dictionary. Seed Pluggable Database 290 is used to rapidly create a nascent pluggable database, and facilitates fast provisioning of such pluggable databases. Seed Pluggable Database 290 contains a basic set of database objects that are frequently needed and/or used. For example, Seed Pluggable Database 290 may contain database object links to common database objects and views for accessing the pluggable database dictionary and other system information.

Database Dictionaries 211, 221, and 231 are expositive and illustrative of database dictionaries in a container DBMS but are not limiting.

Establishing Database Session for a Database

Users access a database of the Container DBMS 200 by establishing a database session. Before describing how to establish a database session for a database in the Container DBMS 200, a further description of database sessions is useful.

A database session comprises a particular connection established for a client to a database server, such as a database instance, through which the client issues a series of requests (e.g., requests for execution of database statements). The database server may maintain session state data about the session. The session state data reflects the current state of the database session and may contain the identity of the user for which the database session is established, services used by the user, instances of object types, language and character set data, statistics about resource usage for the session, temporary variable values generated by processes executing software within the database session, and storage for cursors and variables and other information. If a database dictionary has been attached to the database session, session state for the database session includes one or more references or links needed to access the attached database dictionary.

Figure 3:
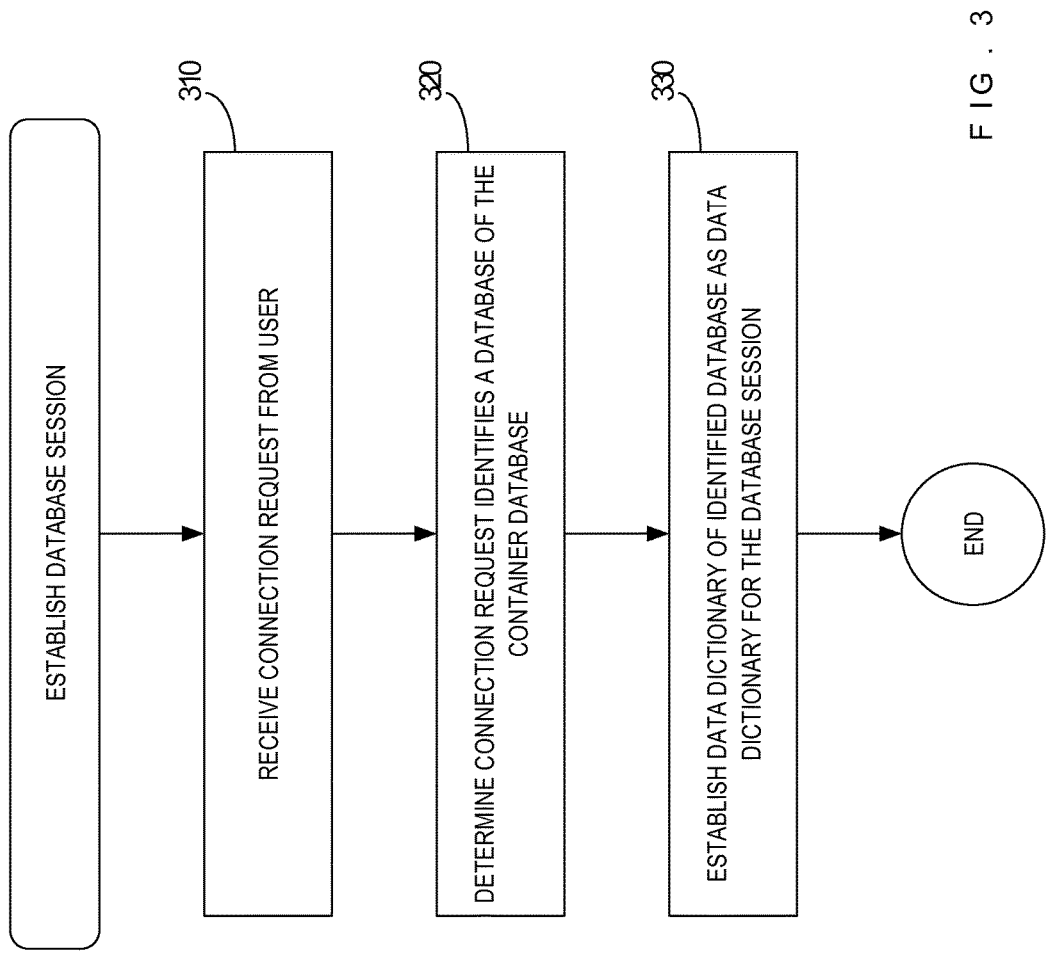
FIG. 3 depicts a procedure comprising steps that are performed particularly for establishing a database session for a database in a container database.

FIG. 3 depicts a procedure comprising steps that are performed particularly for establishing a database session for a database in a container database. Referring to FIG. 3, at step 310, a database server hosting a container database receives a connection request, and, in conjunction with the connection request, parameter values, which include a database identifier. The database identifier may be any information that is usable to identify a database in Container DBMS 200 for which access is being requested. In an embodiment, the database identifier may be the name of a database. In another embodiment, the database identifier may be a database service associated with a database.

At step 320, it is determined that the database connection request is a request for a database session for a database in Container DBMS 200. This determination may be made by, for example, determining that the database identifier identifies pluggable database PDA.

At step 330, in response to the determination that the database connection request is a request for a database in Container DBMS 200, a database session for the database is established. Establishing the database session for the database includes attaching the database dictionary of the database. In the current example, the Database Dictionary 221, the database dictionary for Pluggable Database PDA 220, is established as the database dictionary for the database session.

Establishing a database session for a user entails more operations than specifically depicted in FIG. 3. Such operations include, without limitation, authentication of the user issuing the connection request and initialization of session state.

Isolation of Administration

Within Container DBMS 200, privileges of a user may be isolated to a particular database or a set of databases. The database dictionary of a database defines users and the respective user privileges of the users. Defining privileges for a user in the database dictionary of a database grants the privileges only for that database, and not for other databases of the Container DBMS 200. To perform operations on a database, a user establishes a database session for the database. The user must have privileges defined in the database dictionary of the database that allow the user to perform the operations. For example, the user may only add definitions for database objects to the attached database dictionary, or alter the definition of a database object already defined by the attached database dictionary. As a consequence, each database in Container DBMS 200 may be utilized by separate a set of users that may not access or even know of the other databases in Container DBMS 200.

Administration of a Container DBMS 200 may require administrative privileges defined in the Root Database 210. Such administrative privileges include the right (1) to create a pluggable database, 2) to plug a pluggable database into Container DBMS 200, and (3) to allocate Container DBMS 200 resources between databases.

Common Users

In some cases, users of the Container DBMS 200 may need to access multiple databases of the Container DBMS 200. In one approach, an administrator may connect to each of the applicable databases individually and create the user. However, when the user needs to be created in a large number of databases, connecting to each database and setting up the user account can be a very time consuming and tedious process. Furthermore, if the user's information needs to be updated (e.g. changing a password) the administrator would need to log into each database where the user has been defined and make the necessary modifications.

For administrative convenience, in an embodiment, Container DBMS 200 provides the means to create users from the Root Database 210 that are common among all databases of the Container DBMS 200 ("common users"). For convenience, users defined only within a particular pluggable database or the Root Database 210 will be referred to as "local users".

Figure 4:
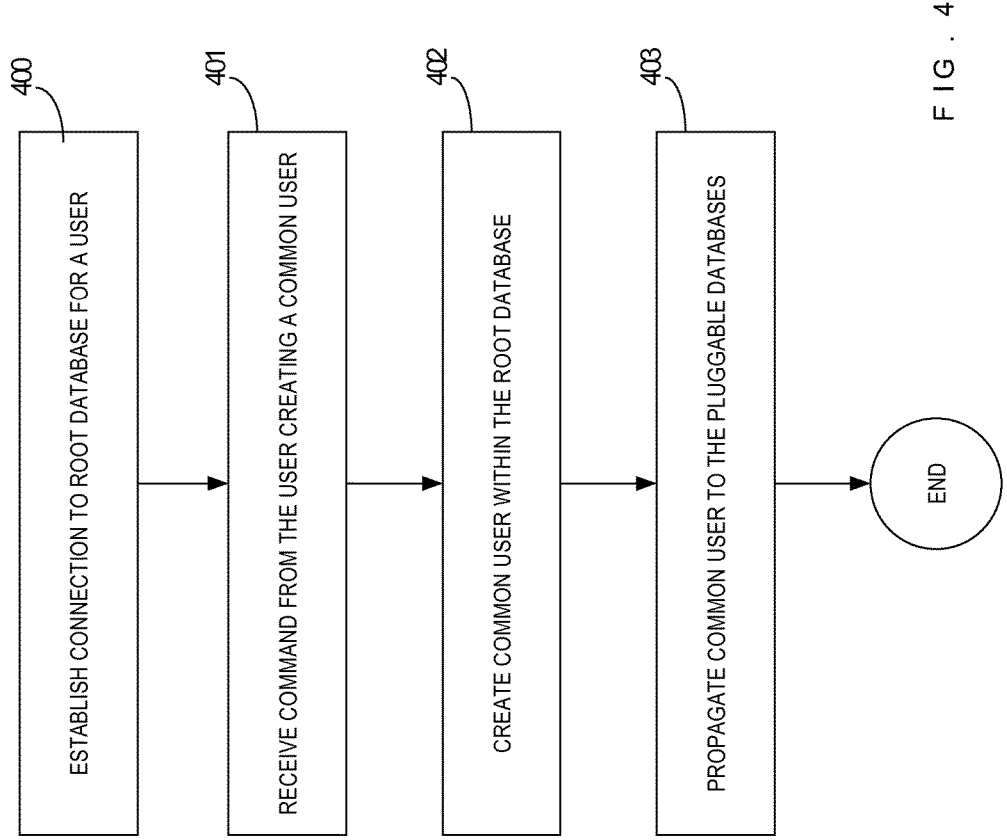
FIG. 4 is a flowchart showing operations performed for establishing a common user in a container database, according to an embodiment.

FIG. 4 depicts a procedure comprising steps that are performed for establishing a common user of a container database. For the purpose of illustrating clear examples, it will be assumed that Container DBMS 200 performs the steps of FIG. 4.

At step 400, the Container DBMS 200 establishes a connection for a user to the Root Database 210. In an embodiment, the Container DBMS 200 establishes the connection in accordance with the procedure depicted in FIG. 3. In an embodiment, the user is an administrator or is otherwise a user with sufficient privileges defined in the Root Database 210 to create common users.

At step 401, the Container DBMS 200 receives a command to establish a common user for the container database. In an embodiment, the command specifies at least the name of the common user and information used to verify the identity of the user, such as a password. In some embodiments, the command specifies to create a user common to a subset of the pluggable databases, rather than all the pluggable databases in the Container DBMS 200. In such embodiments, the following steps are performed only with respect to the specified pluggable databases in the subset.

At step 402, the Container DBMS 200 creates the common user within the Root Database 210. For example, the Container DBMS 200 may create an entry in table User_sys 107 of Database Dictionary 211 that defines the user. In some embodiments, the Container DBMS 200 also creates a local schema for the common user within the Root Database 210. For example, the Container DBMS 200 may add an entry in table Schema_sys 103 that defines a schema corresponding to the user name supplied at step 402.

At step 403, the Container DBMS 200 propagates the common user to the pluggable databases. In an embodiment, the Container DBMS 200 executes the command received at step 401 against each of the pluggable databases. For example, as a result of step 403, the Container DBMS 200 may add corresponding entries to the tables of Database Dictionary 221 and Database Dictionary 231 to define the common user within those databases.

In some embodiments, the Container DBMS 200 propagates a portion the user information to the pluggable databases, but maintains exclusive storage of select user information in the Root Database 210. For example, the user's password may be stored exclusively in the Root Database 210 for security reasons. In such cases, when a common user attempts to connect to a pluggable database, the Container DBMS 200 verifies the common user using the password stored in Database Dictionary 211. For example, the password attribute of the user tables for the pluggable databases may contain one or more references to where the password for the common user is stored in within the Root Database 210.

As a result of FIG. 4, an administrator or other privileged user is able to create, from the Root Database 210, a common user on all databases, without the need to separately connect to each database. However, although the common user may share the same user name and verification information across the databases, the privileges assigned to the common user and the schema(s) defining the database objects owned by the common user may differ between the pluggable databases. For example, the common user may wind up owning Local Object A in Pluggable Database PDA 220 and Local Object B in Pluggable Database PDB 230. Thus, while connected to Pluggable Database PDA 220, the common user can access Local Object A, but not Local Object B. In order to allow the common user to access the same object across databases, the object can be created as a common object as described above.

In an embodiment, to remove or modify a common user, the Container DBMS 200 follows the same procedure as FIG. 4, but instead modifies or removes the common user's entries in the appropriate tables of the Root Database 210 at step 402 and propagates those changes to the pluggable databases at step 403.

In some embodiments, in the event that a new pluggable database is added to the container database, the Container DBMS 200 propagates each of the common users from the Root Database 210 to the new pluggable database. In some cases, a common user may be created while one or more of the pluggable databases are closed or otherwise inaccessible. Thus, in an embodiment, when a pluggable database is reopened, the Container DBMS 200 propagates the common users created while the pluggable database was closed.

Common Roles

As mentioned earlier, roles represent bundles of privileges. When a user is assigned a role, that user receives each of the privileges associated with the role. Thus, administrators are saved from the inconvenience of having to separately grant each of the privileges associated with the role for every applicable user. However, in the context of a container database, the administrator may find themselves recreating the same role in many different databases. For example, the administrator may define a common role for low-ranking users who are only allowed to query the pluggable database objects (e.g. tables) and a role for high-ranking users who are also allowed to modify database objects. In order to use those two roles in every database, the administrator can separately connect to each database of the Container DBMS 200 and add the roles to the corresponding database dictionary. However, this would result in the creation of local roles that are completely independent of each other and would need to be managed individually one database at a time.

In some embodiments, to save administrators from this time-consuming task, the Container DBMS 200 supports roles that are shared across the databases of the Container DBMS 200 ("common roles"). For convenience, roles defined only within a particular pluggable database or the Root Database 210 will be referred to as "local roles".

Figure 5:
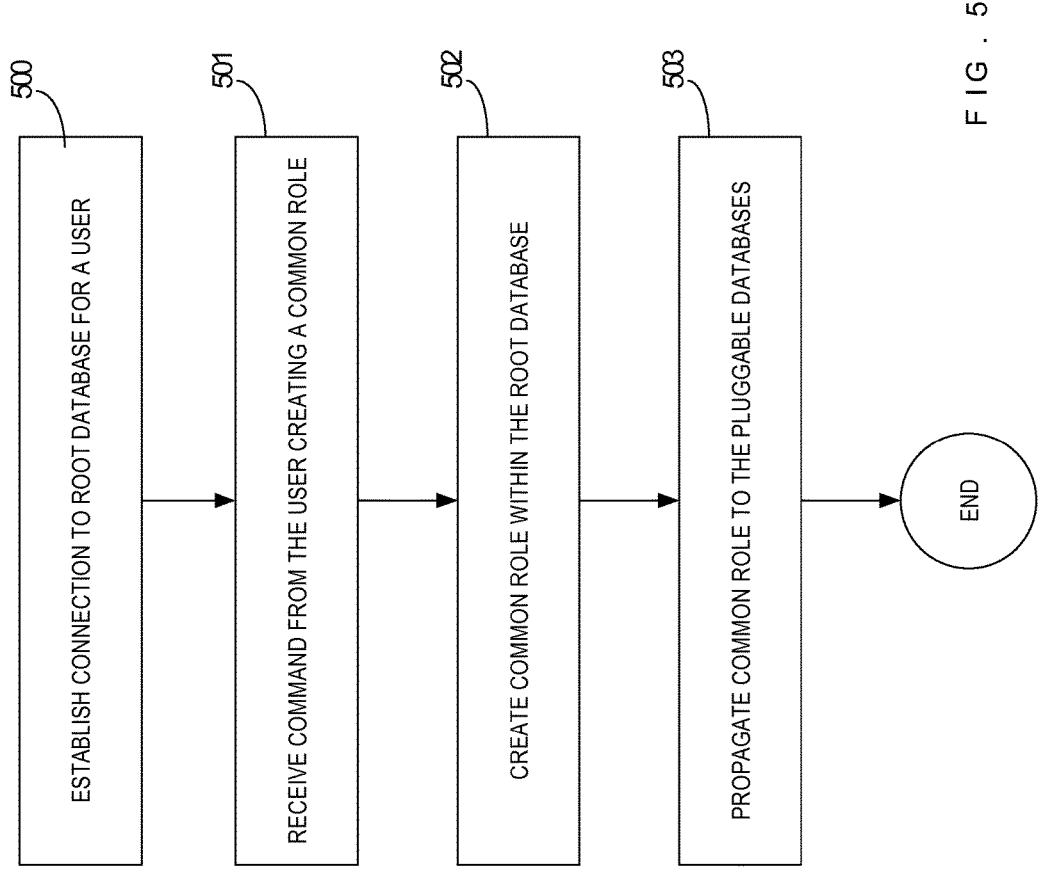
FIG. 5 is a flowchart showing operations performed for establishing a common role in a container database, according to an embodiment.

FIG. 5 depicts a procedure comprising steps that are performed for establishing a common role in a container database. For the purpose of illustrating clear examples, it will be assumed that Container DBMS 200 performs the steps of FIG. 5.

At step 500, the Container DBMS 200 establishes a connection for a user to the Root Database 210. In an embodiment, the Container DBMS 200 establishes the connection in accordance with the procedure depicted in FIG. 3. In an embodiment, the user is an administrator or is otherwise a user with sufficient privileges defined in the Root Database 210 to create common roles.

At step 501, the Container DBMS 200 receives a command to create a common role in the container database. In an embodiment, the command specifies at least the name of the common role and one or more privileges to be included in the common role. In some embodiments, in addition to the one or more privileges, the command may also specify another common role defined in the Root Database 210, in which case the privileges associated with the other common role may be interpreted by the Container DBMS 200 as included within the one or more privileges. In some embodiments, the command specifies to create a role common to a subset of the pluggable databases, rather than all the pluggable databases in the Container DBMS 200. In such embodiments, the following steps are performed only with respect to the specified pluggable databases in the subset.

At step 502, the Container DBMS 200 creates the common role within the Root Database 210. For example, the Container DBMS 200 may create an entry in table Role_sys 108 of Database Dictionary 211 that defines the role.

At step 503, the Container DBMS 200 propagates the common role to the pluggable databases. In an embodiment, the Container DBMS 200 executes the command received at step 501 against each of the pluggable databases. For example, as a result of step 403, the Container DBMS 200 may add corresponding entries to the tables of Database Dictionary 221 and Database Dictionary 231 to define the common role within those databases.

In an embodiment, to remove or modify a common role, the Container DBMS 200 follows the same procedure as FIG. 4, but instead modifies or removes the common role's entries in the appropriate tables of the Root Database 210 at step 402 and propagates those changes to the pluggable databases at step 403.

In some embodiments, in the event that a new pluggable database is added to the container database, the Container DBMS 200 propagates each of the common roles from the Root Database 210 to the new pluggable database. In some cases, a common role may be created while one or more of the pluggable databases are closed or otherwise inaccessible. Thus, in an embodiment, when a pluggable database is reopened, the Container DBMS 200 propagates the common roles created while the pluggable database was closed.

Commonly-Granted Privileges and Roles

In some embodiments, the Container DBMS 200 allows privileges to be granted either commonly or locally. When privileges are granted commonly, the associated rights are granted for every database of the Container DBMS 200. When privileges are granted locally, the associated rights are granted only for the particular database to which the grantor is connected.

In some embodiments, privileges can only be commonly-granted from the Root Database 210. In addition, a privilege can only be commonly-granted to a common user/role and, in cases of privileges on an object, the object must be a common object. Since local objects, local users, and local roles are only defined within a particular database, the dictionaries of the other databases may not define an equivalent structure to which the Container DBMS 200 may apply the commonly-granted privilege.

In an embodiment, when a privilege is commonly-granted to a common user in the Root Database 210, the Container DBMS 200 propagates the privilege to the tables that define users in the database dictionaries of the pluggable databases. Similarly, when a commonly-granted privilege is revoked, removal of the privilege is also propagated to the pluggable databases. However, when a privilege is granted or revoked locally, the privilege is only added to or removed from the table that defines users in the database dictionary of the particular database to which the grantor or revoker of the privilege is connected. In some embodiments, the Container DBMS 200 supports commonly-granting privileges within a subset of the pluggable databases, rather than all the pluggable databases in the Container DBMS 200.

For example, a privilege to execute DDL commands may be commonly-granted to a common user from the Root Database 210. The commonly-granted privilege gives the common user the right to execute DDL commands in any database to which the common user is connected. However, in another scenario, the same privilege may be granted locally at Pluggable Database PDA 220, thus only granting the common user the right to execute DDL commands in Pluggable Database PDA 220, unless the same privilege is separately granted in other databases.

In an embodiment, common roles may be granted privileges commonly or locally. Commonly-granting a privilege to a common role adds the privilege to the common role in every database of the Container DBMS 200. Locally-granting a privilege to a common role only adds the privilege to the common role in the database to which the grantor is connected. As a result, a user assigned a common role will always receive the common role's commonly-granted privileges, regardless of the database in which the common role was granted. However, in some databases, the common role may also grant the user additional locally-granted privileges.

For example, assume common role A is commonly-granted privilege P1 and locally-granted privilege P2 in Pluggable Database PDB 230. When common role A is granted to a user in Pluggable Database PDA 220, the user only receives the commonly-granted privilege P1. However, when common role A is granted to a user in Pluggable Database PDB 230, the user receives the commonly-granted privilege P1 and also the locally-granted privilege P2.

In an embodiment, privileges can be commonly granted to or revoked from common roles only from the Root Database 210. When a privilege is commonly granted to or revoked from a common role at the Root Database 210, the Container DBMS 200 propagates the resulting changes to the role tables in the database dictionaries of the pluggable databases. In addition, when a locally-granted privilege is given to or removed from a common role, the Container DBMS 200 adds or removes the privilege from the role table in the database dictionary of only the database to which the grantor or revoker is connected.

In an embodiment, common roles may be granted either commonly or locally. However, a common role can only be commonly-granted to a common user and only from the Root Database 210. When a common role is commonly-granted to a common user from the Root Database 210, the Container DBMS 200 propagates the common user's grant of the common role to each of the pluggable databases. However, although the common role is granted to the common user in all databases, the actual privileges that the common user receives in each pluggable database will vary depending on the privileges commonly-granted and locally-granted to the common role. When a commonly-granted common role is revoked, the Container DBMS 200 propagates the revocation to the pluggable databases. When a common role is granted to or revoked from a user locally, the Container DBMS 200 only adds or removes the role for the user at the database to which the grantor or revoker is connected. In some embodiments, the Container DBMS 200 supports commonly-granting roles to a common user in a specified subset of the pluggable databases, rather than all the pluggable databases in the Container DBMS 200.

Transporting Pluggable Database

The architecture of a container DBMS greatly facilitates transporting databases between database servers and/or DBMSs. The tablespace files and the dictionary store may be moved between environments of container DBMSs using readily available mechanisms for copying and moving files. The tablespace files, along with one or more dictionary files, are referred to herein collectively as a transportable database package.

Once the transportable database package of a pluggable database is moved to the environment of the target container database the pluggable database can be plugged into the target container database. In an embodiment, plugging in the pluggable database is performed in response to receiving a DDL command to plug in the pluggable database, the DDL command also identifying the transportable database package. In response to receiving the DDL command, the container DBMS plugs in the pluggable database. Plugging in the pluggable database entails such operations as updating the root database dictionary to define the pluggable database, such updates including, for example, adding a record to Database_sys 203. Error checking is also performed. For example, checks are performed to ensure that the name of the pluggable database is unique within the container database and that tablespace files are not already being used for other tablespaces in the container database.

Namespace Division

In some embodiments, the Container DBMS 200 divides the namespace between common users and roles, and local users and roles. For example, the Container DBMS 200 may require the names of common users and roles to start with a particular substring, such as "C##".

One reason that the Container DBMS 200 may divide the namespace is to ensure that the names of local users and roles created in the pluggable databases will not conflict with the names of common users and roles defined in the container database.

For example, assume that a new pluggable database is added to the container database, but the new pluggable database contains a pre-existing local user that has the same name as a common user already defined for the container database. When the Container DBMS 200 attempts to propagate the common user to the new pluggable database, a conflict will be detected since the database dictionary of the new pluggable database already contains an entry with the same name. Since applications or other users of the new pluggable database may rely upon the local user that has already been defined, the Container DBMS 200 may be unable to modify or change the local user without causing critical issues. The Container DBMS 200 may even need to keep the new pluggable database locked until an administrator can resolve the conflict. Thus, by dividing the namespace, the Container DBMS 200 avoids potential conflicts, provided that the users and roles adhere to the naming convention.

Abandoned Common Users and Roles as a Result of Transport

Transporting a pluggable database from a source container database to a target container database may cause a common user to become "abandoned". An abandoned common user occurs when the pluggable database stores metadata and/or data (e.g. schema, roles, privileges, data objects, etc.) for a common user that does not exist in the target container database. Opening access to the database for an abandoned common user can be problematic. For example, due to the division of the namespace, an abandoned common user cannot be easily converted into a local user. If the name of the common user is kept the same, the naming convention is violated. On the other hand, if the name is modified, users or procedures that rely on the common user's name will cease to function properly. As another example, for security reasons, the information to verify the common user (e.g. the common user's password) may have only been stored in the root database of the source container database. Thus, when the pluggable database was transported to the target container database, the common user's verifying information was left behind in the source container database.

In some embodiments, the Container DBMS 200 locks the accounts of abandoned common users until an administrator resolves the issue. Locking the common user's account may not necessarily render the common user's data and metadata unavailable. For example, the Container DBMS 200 may not allow the abandoned common user to connect to the pluggable database, but may still allow other users who have been granted privileges to act on the common user's schema or database objects the ability to exercise those privileges.

In some embodiments, abandoned common users can be recovered by recreating the common user in the root database of the target database. For example, an administrator may instruct the Container DBMS 200 to create a common user in the root database with the same name as the abandoned common user and a new password. When the Container DBMS 200 attempts to propagate the common user, the Container DBMS 200 detects that the pluggable database already contains an entry for the common user, and leaves the common user's metadata in place. The Container DBMS 200 then unlocks the common user's account and allows the common user to connect to the pluggable database using the new password.

For the same reasons that a common user may be abandoned after transport, a common role may also become abandoned. In an embodiment, when the Container DBMS 200 detects an abandoned common role, the pluggable database is opened in a restricted mode. In the restricted mode, only users with administrative privileges are able to connect to the pluggable database in order to perform clean up. This can take the form of creating a local role, granting to the local role the same privileges as were granted to the abandoned role, granting the new local role to the grantees of the abandoned common role, and removing the abandoned common role from the pluggable database. As an alternative, the abandoned common role can be recreated from the root database of the target container database.

In some embodiments, after transport, the root database of the target container database may already define a common user with the same name as a common user on the pluggable database. In such events the Container DBMS 200 considers the common users to be the same entity and allows the common user to connect to the pluggable dataset using the password already defined in the root database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
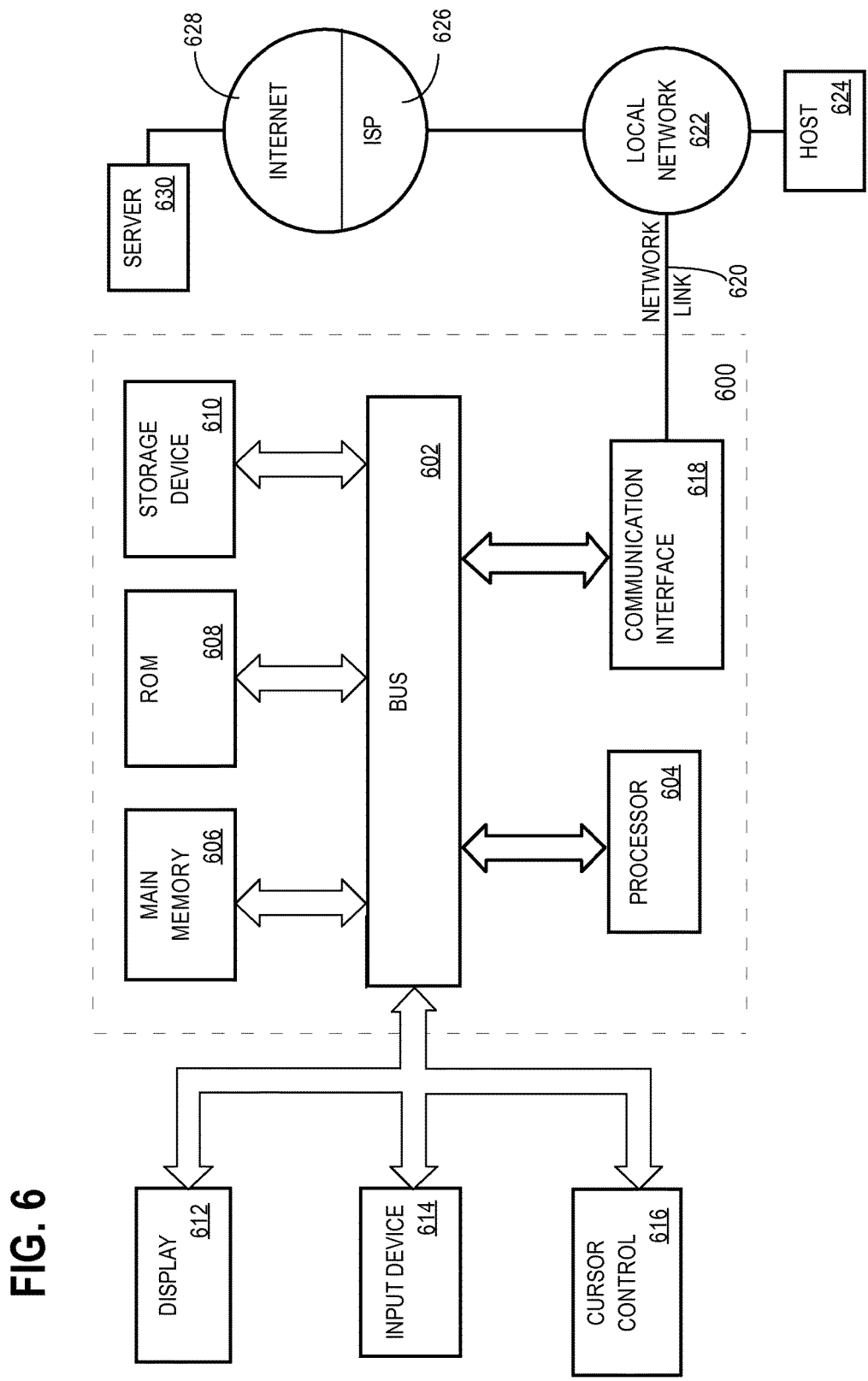
FIG. 6 is a diagram depicting a computer system that may be used in an embodiment of the present invention.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a database server maintaining a container database that comprises two or more pluggable databases;
   the database server receiving a first single instruction specifying to create a common user across each of the two or more pluggable databases;
   in response to receiving the first single instruction, the database server creating the common user separately in each pluggable database of the two or more pluggable databases, wherein creating the common user for each pluggable database of the two or more pluggable databases allows the common user to establish a session to each pluggable database of the two or more pluggable databases;
   the database server receiving a second single instruction specifying to create a common role across each of the one or more pluggable databases;
   in response to receiving the second single instruction, the database server creating, without establishing a respective client session for each pluggable database of the two or more pluggable databases, the common role for each respective pluggable database of the one or more pluggable databases;
   wherein the method is performed by one or more computing devices.

2. The method of claim 1, further comprising:
   the database server receiving third one or more instructions specifying to commonly grant one or more privileges to the common role across each of the one or more pluggable databases;
   in response to receiving the third one or more instructions, the database server granting the one or more privileges to the common role for each individual pluggable database of the one or more pluggable databases.

3. The method of claim 2, further comprising:
   the database server receiving fourth one or more instructions specifying to grant the common role to a user in at least a particular pluggable database of the one or more pluggable databases;
   in response to receiving the fourth one or more instructions, granting the common role to the user, wherein granting the common role to the user grants the user the one or more privileges granted to the common role.

4. The method of claim 3, wherein the user is the common user.

5. The method of claim 2, further comprising:
   the database server receiving fourth one or more instructions specifying to commonly grant the common role to the common user across each of the one or more pluggable databases;
   in response to receiving the fourth one or more instructions, granting the common role to the common user in each pluggable database of the one or more pluggable databases, wherein granting the common role to the common user grants the common user the one or more privileges granted to the common role in each pluggable database of the one or more pluggable databases.

6. The method of claim 1, wherein the one or more pluggable databases includes at least two distinct pluggable databases.

7. The method of claim 1, further comprising:
the database server receiving second one or more instructions specifying to commonly grant one or more privileges to the common user across each of the one or more pluggable databases;
in response to receiving the second one or more instructions, granting the one or more privileges to the common user for each respective pluggable database of the one or more pluggable databases.

8. The method of claim 1, further comprising transporting a particular pluggable database of the one or more pluggable databases to a new container database.

9. The method of claim 1, wherein each pluggable database of the one or more pluggable databases stores a database dictionary that defines the pluggable database.

10. A non-transitory computer-readable storage medium storing one or more instructions which, when executed by one or more processors, cause:
a database server maintaining a container database that comprises two or more pluggable databases;
the database server receiving a first single instruction specifying to create a common user across each of the two or more pluggable databases;
in response to receiving the first single instruction, the database server creating the common user separately in each pluggable database of the two or more pluggable databases, wherein creating the common user for each pluggable database of the two or more pluggable databases allows the common user to establish a session to each pluggable database of the one or more pluggable databases;
the database server receiving a second single instruction specifying to create a common role across each of the one or more pluggable databases;
in response to receiving the second single instruction, the database server creating, without establishing a respective client session for each pluggable database of the two or more pluggable databases, the common role for each respective pluggable database of the one or more pluggable databases.

11. The non-transitory computer-readable storage medium of claim 10, wherein the one or more instructions further cause:
the database server receiving third one or more instructions specifying to commonly grant one or more privileges to the common role across each of the one or more pluggable databases;
in response to receiving the third one or more instructions, the database server granting the one or more privileges to the common role for each individual pluggable database of the one or more pluggable databases.

12. The non-transitory computer-readable storage medium of claim 11, wherein the one or more instructions further cause:
the database server receiving fourth one or more instructions specifying to grant the common role to a user in at least a particular pluggable database of the one or more pluggable databases;
in response to receiving the fourth one or more instructions, granting the common role to the user, wherein granting the common role to the user grants the user the one or more privileges granted to the common role.

13. The non-transitory computer-readable storage medium of claim 12, wherein the user is the common user.

14. The non-transitory computer-readable storage medium of claim 11, wherein the one or more instructions further cause:
the database server receiving fourth one or more instructions specifying to commonly grant the common role to the common user across each of the one or more pluggable databases;
in response to receiving the fourth one or more instructions, granting the common role to the common user in each pluggable database of the one or more pluggable databases, wherein granting the common role to the common user grants the user the one or more privileges granted to the common role in each pluggable database of the one or more pluggable databases.

15. The non-transitory computer-readable storage medium of claim 10, wherein the one or more pluggable databases includes at least two distinct pluggable databases.

16. The non-transitory computer-readable storage medium of claim 10, wherein the one or more instructions further cause:
the database server receiving second one or more instructions specifying to commonly grant one or more privileges to the common user across each of the one or more pluggable databases;
in response to receiving the second one or more instructions, granting the one or more privileges to the common user for each respective pluggable database of the one or more pluggable databases.

17. The non-transitory computer-readable storage medium of claim 10, wherein the one or more instructions further cause:
transporting a particular pluggable database of the one or more pluggable databases to a new container database.

18. The non-transitory computer-readable storage medium of claim 10,
wherein each pluggable database of the one or more pluggable databases stores a database dictionary that defines the pluggable database.

19. The method of claim 1 wherein:
said container database comprises three or more pluggable databases;
said first single instruction specifying to create said common user across each of the two or more pluggable databases comprises said first single instruction specifying to create said common user across fewer than all of said three or more pluggable databases.

20. The method of claim 1 wherein creating the common user for each pluggable database comprises not storing a password of said common user in said two or more pluggable databases.

21. The method of claim 1 wherein:
said two or more pluggable databases comprises a particular pluggable database that is out of service;
creating the common user for each pluggable database comprises deferring creating the common user for said particular pluggable database until said particular pluggable database resumes service.

22. The method of claim 1 further comprising, in response to adding a new pluggable database to said container database, the database server creating:
the common user in said new pluggable database, and
the common role in said new pluggable database.

23. The method of claim 1 wherein:

in a first pluggable database of the two or more pluggable databases, said common role includes a first set of privileges, and in a second pluggable database of the two or more pluggable databases, said common role includes a second set of privileges that is different from said first set of privileges.

\* \* \* \* \*

UNITED STATES PATENT AND TRADEMARK OFFICE
CERTIFICATE OF CORRECTION

PATENT NO. : 10,191,671 B2  
APPLICATION NO. : 14/835507  
DATED : January 29, 2019  
INVENTOR(S) : Kruglikov et al.

Page 1 of 1

It is certified that error appears in the above-identified patent and that said Letters Patent is hereby corrected as shown below:

In the Drawings

On sheet 2 of 6, in FIG. 2, Line 4, delete "Pluggabe" and insert -- Pluggable --, therefor.

In the Specification

In Column 1, Line 13, delete "et. al.," and insert -- et al., --, therefor.

In Column 1, Line 17, delete "et. Al," and insert -- et al., --, therefor.

In Column 6, Line 12, delete "FIG. 1" and insert -- FIG. 1. --, therefor.

In Column 6, Line 50, delete "tablespaces's" and insert -- tablespaces' --, therefor.

Signed and Sealed this  
Twenty-eighth Day of January, 2020

Andrei Iancu  
*Director of the United States Patent and Trademark Office*